US012696881B2

(12) United States Patent
Kossmann Perl

(10) Patent No.: US 12,696,881 B2
(45) Date of Patent: Aug. 4, 2026

(54) CONTINUOUS IN-SITU THERAPEUTIC TREATMENT SYSTEM FOR FISH IN FRESHWATER, FROM SEAWATER

(71) Applicant: Hans Jorg Kossmann Perl, Puerto Varas (CL)

(72) Inventor: Hans Jorg Kossmann Perl, Puerto Varas (CL)

(73) Assignee: Salmoclinic Spa, Puerto Varas (CL)

( * ) Notice: Subject to any disclaimer, the term of this patent is extended or adjusted under 35 U.S.C. 154(b) by 199 days.

(21) Appl. No.: 18/251,234

(22) PCT Filed: May 17, 2021

(86) PCT No.: PCT/CL2021/050041
§ 371 (c)(1),
(2) Date: Oct. 24, 2023

(87) PCT Pub. No.: WO2022/087757
PCT Pub. Date: May 5, 2022

(65) Prior Publication Data
US 2025/0185632 A1     Jun. 12, 2025

(30) Foreign Application Priority Data
Oct. 30, 2020     (CL)     .................................... 28342020

(51) Int. Cl.
A01K 61/13         (2017.01)
A01K 63/04         (2006.01)
(Continued)

(52) U.S. Cl.
CPC ................ A01K 61/13 (2017.01); C02F 9/00 (2013.01); A01K 63/04 (2013.01); C02F 1/004 (2013.01);
(Continued)

(58) Field of Classification Search
CPC ................................ A01K 61/13; A01K 61/04
See application file for complete search history.

(56) References Cited

U.S. PATENT DOCUMENTS

2018/0255749 A1     9/2018   Wiesman et al.
2018/0295816 A1*   10/2018   Wiesman ............... A01K 61/13

FOREIGN PATENT DOCUMENTS

JP         02182127 A     7/1990
WO      2017123096 A1     7/2017

OTHER PUBLICATIONS

International Search Report mailed May 5, 2022 issued in connection with International Application No. PCT/CL2021/050041 (3 pages total).

(Continued)

*Primary Examiner* — Kimberly S Berona
*Assistant Examiner* — Nevena Aleksic
(74) *Attorney, Agent, or Firm* — Tatonetti IP

(57) ABSTRACT

The proposed invention corresponds to a fish treatment system for disinfection and deworming in situ, using a system of tubes for the transport of live fish throughout the system in fresh water, obtained directly from salt water or spring water. sea, where the fish are transported by the different sections of the disinfection system from the diseased fish farming unit, through the treatment pond and to the treated fish farming unit, where the removal of parasites in fresh water It is carried out by chemical, electrochemical, mechanical and energetic means, in the treatment pond and later, the treatment water is treated for the removal of medicine and finally reconstituted to the initial conditions (sea water) to be returned to the environment.

17 Claims, 2 Drawing Sheets

(51) Int. Cl.

| | |
|---|---|
| *C02F 1/00* | (2023.01) |
| *C02F 1/20* | (2023.01) |
| *C02F 1/32* | (2023.01) |
| *C02F 1/44* | (2023.01) |
| *C02F 1/66* | (2023.01) |
| *C02F 1/68* | (2023.01) |
| *C02F 1/72* | (2023.01) |
| *C02F 9/00* | (2023.01) |
| *C02F 101/10* | (2006.01) |
| *C02F 103/08* | (2006.01) |

(52) U.S. Cl.
CPC .................. *C02F 1/20* (2013.01); *C02F 1/32* (2013.01); *C02F 1/441* (2013.01); *C02F 1/66* (2013.01); *C02F 1/68* (2013.01); *C02F 1/72* (2013.01); *C02F 2101/10* (2013.01); *C02F 2103/08* (2013.01); *C02F 2201/001* (2013.01); *C02F 2209/02* (2013.01); *C02F 2209/22* (2013.01); *C02F 2209/40* (2013.01); *C02F 2209/42* (2013.01); *C02F 2301/024* (2013.01); *C02F 2301/046* (2013.01); *C02F 2303/04* (2013.01); *C02F 2303/18* (2013.01); *C02F 2305/023* (2013.01)

(56) References Cited

OTHER PUBLICATIONS

Written Opinion of the International Searching Authority issued May 5, 2022 issued in connection with International Application No. PCT/CL2021/050041 (8 pages total).

* cited by examiner

FIG. 2

CONTINUOUS IN-SITU THERAPEUTIC TREATMENT SYSTEM FOR FISH IN FRESHWATER, FROM SEAWATER

CROSS-REFERENCES TO RELATED APPLICATIONS

This Non-Provisional US Patent Application claims the benefit of and priority to PCT Application Serial No. PCT/CL2021/050041, filed May 5, 2022, entitled "Continuous In-Situ Therapeutic Treatment System for Freshwater Fish Using Seawater," which claims the benefit of and priority to Chilean Patent Application Serial No. 2834-2020, filed Oct. 30, 2020, entitled "Continuous In-Situ Therapeutic Treatment System for Freshwater Fish Using Seawater," the entire contents of both applications of which are hereby incorporated herein by reference.

BACKGROUND

The technology described here is generally related to systems, methodologies and instruments for the treatment of fish infections or diseases, especially salmon, in the salmon industry and aquaculture in general.

In general, the problem of treating parasites in fish (e.g. sea lice) is widely known, and to date, the use of drugs has been the most used strategy in recent times, and there is extensive literature on the matter.

In recent times, various treatment initiatives have been identified, especially in the national industry, to carry out a safe extraction of parasites in-situ without harming the fish and directly in the culture environment, or by transporting fish through treatment ponds, in order to carry out a safe extraction of the parasite and harmless to fish (GB 1610275.8, NO 20160137, CL 201701776).

However, in each of the existing technologies there are variations regarding the effectiveness of the methods used, and in addition, the difficulty of handling the waste resulting from the treatment of fish, which poses an additional problem to be solved, especially in facilities that require a system continuous treatment or in those that require large amounts of fresh water for their operation, increasing the cost and difficulties in managing the waste resulting from the process.

Thus, together with the development of an effective and continuous treatment system, it is also necessary to optimize the consumption of natural and artificial resources involved in the process, and the capacity of the system to function in harmony with the environment, without generating pollution or polluting residues as a result of the operation, allowing the performance of this type of treatment in friendly conditions compatible with the environment, reducing the consumption of resources and improving the efficiency of the process.

SUMMARY

The proposed invention corresponds to a fish treatment system for disinfection and deworming in situ, using a system of tubes for the transport of live fish throughout the system in fresh water, obtained directly from salt water or spring water. sea, where the fish are transported by the different sections of the disinfection system from the diseased fish farming unit, through the treatment pond and to the treated fish farming unit, where the removal of parasites in fresh water It is carried out by chemical, electrochemical, mechanical and energetic means, in the treatment pond and later, the treatment water is treated for the removal of medicine and finally reconstituted to the initial conditions (sea water) to be returned to the environment.

BRIEF DESCRIPTION OF THE DRAWINGS

Figure 2:
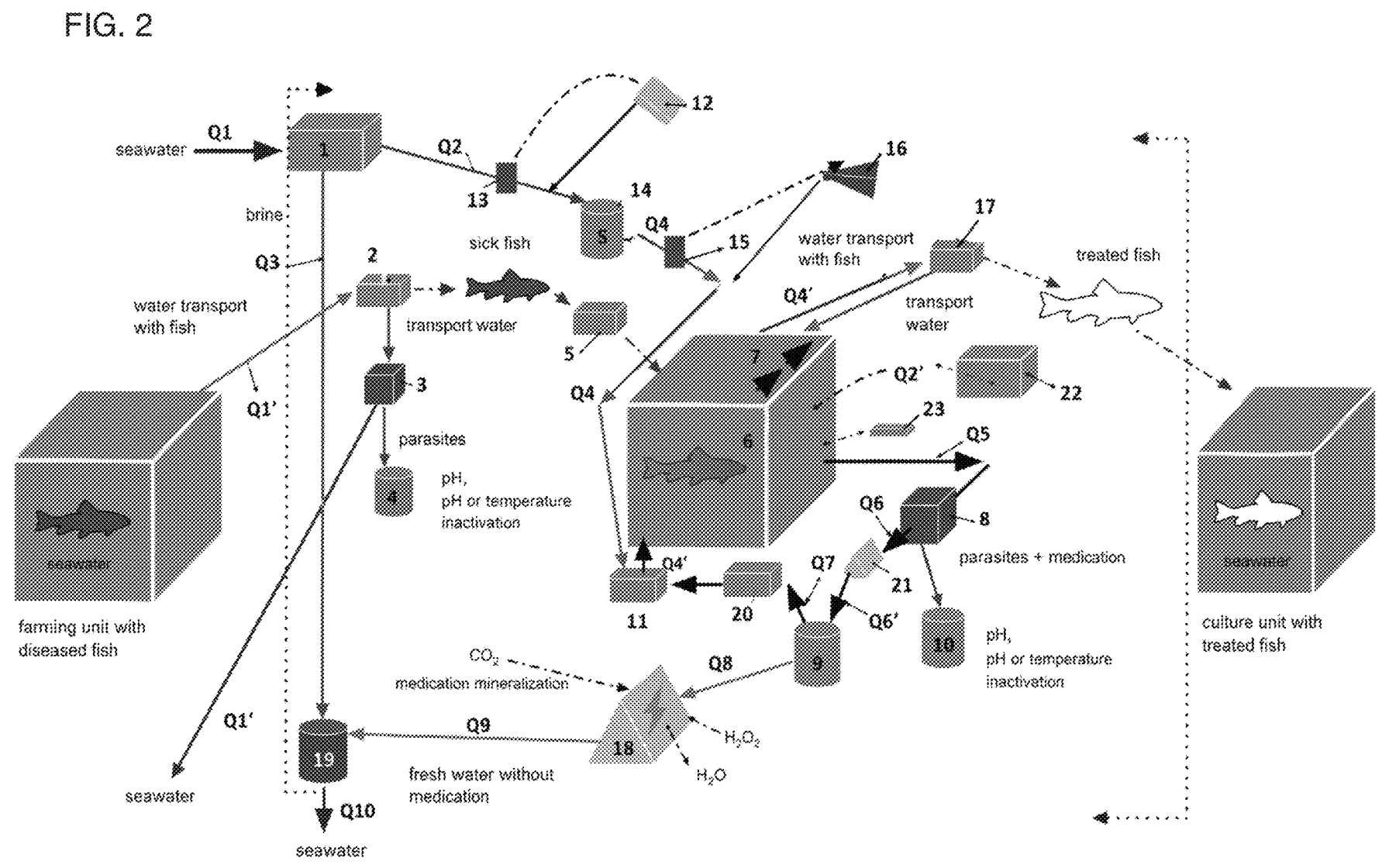

FIG. 2. Detailed diagram of the proposed invention, including the system and details of each of the components necessary for the treatment of fish in-situ.

Figure 1:
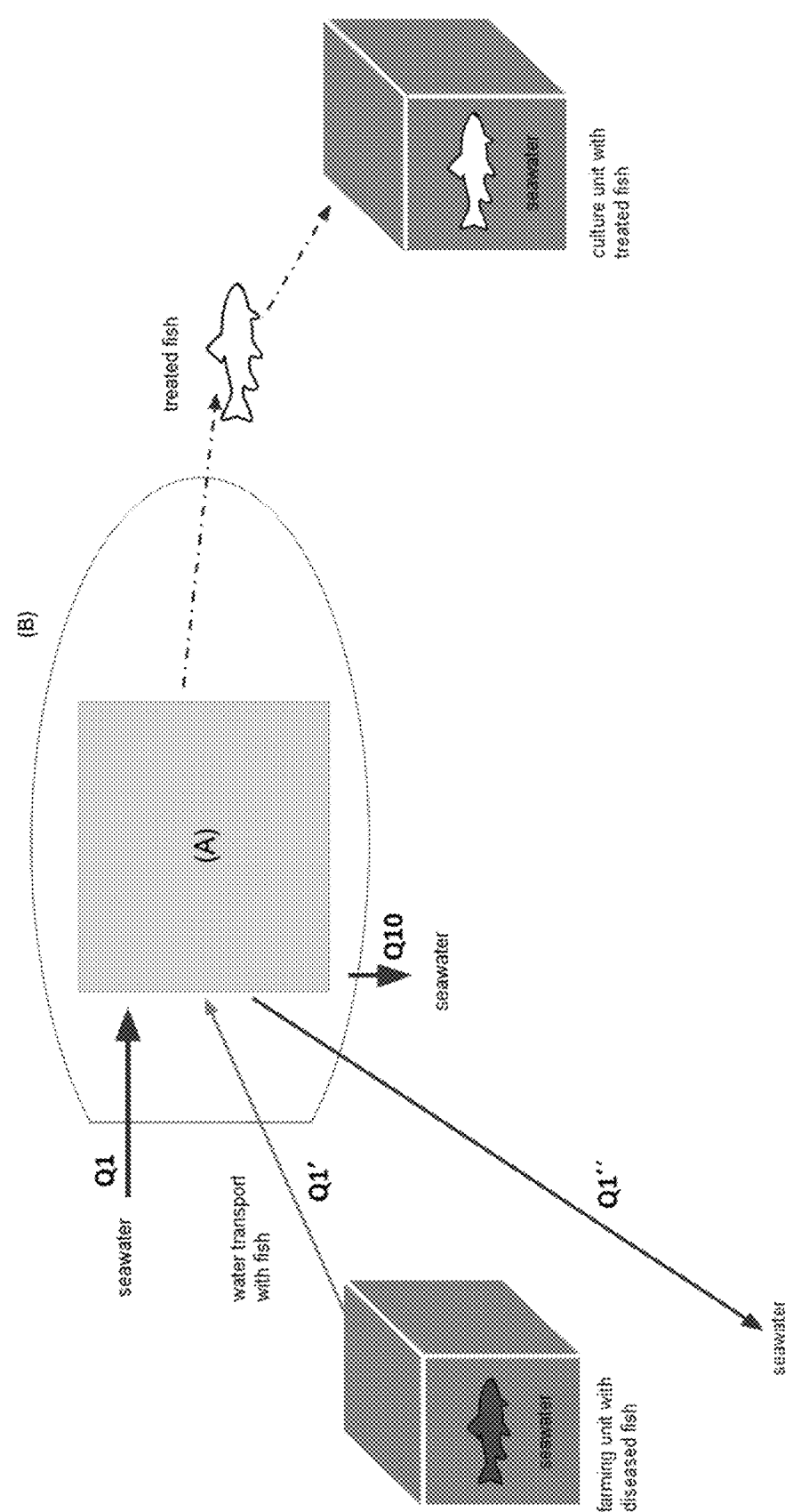
FIG. 1. General scheme of the proposed invention, which includes the in-situ fish treatment system (A), in the context of a boat.

To facilitate the identification of the parts and components of the invention, the list of elements in the figures is listed below:

Reverse Osmosis System (RO).
Fish Separator (1st).
Mechanical Filter.
Pond for the accumulation of retained parasites (1st).
Fish counter.
Treatment Pond.
Monitoring and Registration System (1st).
Filtration Chamber (2nd mechanical filter).
Pond for receiving filtered water.
Pond for the accumulation of retained parasites (2nd).
Degasser.
Mineral dispenser and pH stabilizers.
Flowmeter (1st).
Fresh water accumulator pond.
Flowmeter (2nd).
Medicine and anesthetic dispenser.
Fish separator (2nd).
AOP system
Retention and/or mixing pond.
Temperature controller.
UV system.
Oxygen Generator.
Monitoring and Registration System (2nd).
Q (1, 2, . . . , 10): Flow

DETAILED DESECRIPTION

The proposed invention corresponds to an integrated system of continuous in-situ treatment for fish in fresh water obtained from salt water or sea water, to eliminate parasites from treated fish and thus avoid reinfection in fish, reducing the risk of appearance of resistant parasites, and avoid contamination of the marine environment with organic compounds used in the treatment of fish, which includes:

A fish treatment pond containing within it a system for moving fish from one end of the fish treatment pond to the opposite end of the fish treatment pond, ensuring that the fish receive treatment in a homogeneous and orderly manner, according to their admission to the treatment system;

Differentiated and separate means of entry to the treatment system, for the entry of fish and seawater, respectively, where the fish correspond to sick fish, where the seawater (Q1) will be separated into: fresh water (Q2) and brackish mixture (or brine, Q3) being the fresh water used as a medium for therapeutic treatment in the present treatment system;

A fish transport mechanism, for the transport of fish from the differentiated entrance for fish towards the fish treatment pond and through the different sections and stations present in the integrated treatment system;

A first device for separating (2) the fish from the water with which they are transported from the input means to the fish treatment pond;

A first filter device for retaining parasites (3) located between the fish separator device in d) and a point of direct evacuation to the sea of the water separated from the fish.

A first receiving pond for parasites (4) retained by the filter device in e).

A counter (5) and weight estimator of the fish transported between the means of entry of fish to the continuous therapeutic treatment system and the fish treatment pond (6), where the fish counter delivers in real time the biomass that enters the fish treatment pond and allows the system operator to record, monitor and maintain optimum fish density in the fish treatment pond at all times.

A first monitoring system (7), registration and regulation of the operating speed of the device for the displacement of the fish within the fish treatment pond that allows determining the time the fish remain in the treatment pond and with it the time of exposure to fresh water that may contain therapeutic agents, ensuring a controlled exposure time of fish to the therapeutic treatment in the treatment pond and avoiding overexposure to the therapeutic agent.

A water recirculation circuit (Q5) of the fish treatment pond (6) consisting of (i) at least one second filter device (8), (ii) a receiving pond (9) of filtered water from the second filter device (Q6); (iii) at least one pump to drive the filtered water from the receiving tank (Q7) to (iv) a gas removal system (11) connected to the treatment tank (6) and at least one pump to drive the water filtered from the reception pond (9) to an advanced oxidation system (AOP) (18), for final treatment prior to return to the sea; and (vi) a second pond for the accumulation of organic matter and parasites (10) separated by the second mechanical filter device (8) from the recirculated treatment water (Q5).

A controlled production and injection system of oxygen to the fish treatment pond (22), which comprises at least one sensor for measuring the concentration of oxygen in the water of the treatment pond and which also allows injecting in at least one point of the treatment pond the amount of oxygen necessary to the treatment water to support the oxygen demand of the fish being treated and maintain the oxygen level within the optimal range for the fish, throughout the circuit in i).

A second system for continuous monitoring and recording of physical and chemical parameters of the water in the treatment pond (23) comprising at least: a sensor for measuring dissolved oxygen in fresh water, a sensor for measuring $CO_2$ dissolved in fresh water, a sensor for temperature measurement, a sensor for salinity measurement, a sensor for oxidation reduction potential (ORP) measurement and a sensor for pH measurement;

A reverse osmosis system (1) to separate the water from seawater, from its soluble components and other particles present in seawater, to obtain a flow of purified water (fresh water) (Q2) and a flow of brine (Q3) from the flow of seawater (brackish water) (Q1);

A seawater flow input device (Q1), which feeds the reverse osmosis system in l), entering seawater into the treatment system;

A first dosing device (12) to automatically and controlled add the necessary components to the freshwater flow (Q2) to obtain and maintain freshwater quality with optimum physicochemical parameters for the physiology of the fish being treated, which can be chosen from the list that includes: minerals and stabilizer compounds and/or pH regulators.

At least one flow meter (13) that continuously measures the flow of fresh water produced (Q2) and that delivers said information to the dosing device in n).

A first accumulator pond (14) of fresh water (Q2) with optimum physicochemical parameters for the physiology of the fish to be treated.

At least one variable flow pump (or booster pump) to pump water from the fresh water storage tank (Q2) to mix the fresh water (Q4) with the water from the recirculation circuit (Q7), passing through the degasser (11) and entering with a flow of stabilized water (Q4');

At least one level sensor located in the fish treatment pond connected to the freshwater booster pump to adjust the flow of replacement water to be added to the treatment pond, during continuous therapeutic treatment.

A second flow meter (15), connected to a second metering device;

The second dosing device (16) to automatically and controlledly add at least one therapeutic and/or biologically active compound, useful for the treatment and/or prevention of one or more fish diseases, to the fresh water flow (Q4) entering the treatment pond (6);

A second fish separator device (17), to extract and separate the fish from the treatment pond water to a storage area for treated fish, separating them from the treatment water and returning the separated fish water back to the treatment pond.

The advanced oxidation system (AOP) of organic compounds (18) present in the discharge water (Q8) of the treatment pond (6), which includes at least one oxidation device for the generation of hydroxyl ions (OH—), which can be chosen from the list comprising: an ultraviolet (UV) light device, an electrochemical device, a photochemical device, an oxidizing chemical component and any combinations of these; in order to mineralize organic contaminants into environmentally friendly components, such as $CO_2$, water and inorganic ions;

The second freshwater accumulation tank (9) that contains therapeutic agents, and that connects the outgoing freshwater flow (Q8) from the water recirculation circuit of the treatment tank (6), with the advanced oxidation system (18);

A retention and/or mixing tank (19), which allows accumulating and mixing the fresh water coming out of the advanced oxidation device (Q9) recovered from the treatment circuit, with the brine obtained from the reverse osmosis process from sea water (Q3); and, A reconstituted brackish water flow outlet device (Q10), which returns the neutralized and harmless reconstituted brackish water mixture back to the sea.

The present invention also includes a naval device that contains it, allowing its operation and continuous operation on the high seas, where the naval device can be chosen from the list that includes, but is not limited to: boat, ship, raft, pontoon and any other suitable naval artifact.

In one embodiment of the invention, the fish entry means to the treatment system allows the entry of fish from a fish holding unit, where sick fish or healthy fish that require prophylactic treatment (vaccines, probiotics, etc), to be treated in the continuous therapeutic treatment system, and because additionally, the container unit for sick fish can be chosen from the list that includes: an additional container unit of the naval artifact in which the treatment system is located, a fish container in a floating farm in the sea, a fish pond in a land-based farm that pumps seawater, and a fish container unit in a second naval craft.

In another embodiment of the invention, the osmosis system comprises a prefiltering system for compounds from seawater, where said system comprises the removal of components from seawater in a size range between 75 and 1 microns, in where said removal of the components can be carried out in a single stage, and/or in multiple sequential stages, and where it further comprises a differentiated transport subsystem for the reverse osmosis products independently, including the transport of purified water (Q2) from seawater, separated from the transport of brine and other components extracted from seawater (Q3).

In addition, the fish water separation system of the present invention allows the separation of fish by certain classification parameters, including size, in order to ensure that only fish of a certain size enter the treatment pond, being the fish that do not meet defined grading parameters, discarded and recovered in a separate pond on board the vessel or diverted back to a culture unit.

Regarding the filtration systems of the proposed invention, where at least the first and second filters correspond to mechanical filters, and where also at least the second mechanical filter device is fed by gravity from the fish treatment pond and is intended to remove organic matter and parasites that are released during the treatment of the fish in the treatment pond.

In a variant of the invention, it further comprises a system for controlling the temperature of the fresh water flow connected to the recirculation circuit of the treatment system, to regulate the temperature of the therapeutic treatment system according to the specific parameters required.

The gas removal system of the present invention comprises a degassing device that allows air to circulate to the treatment system to remove gases, including carbon dioxide accumulated in the recirculation flow due to the respiration of the fish in the pond. and return the filtered, disinfected and degassed water by gravity to the fish treatment pond (Q4').

In another embodiment of the invention, the temperature control system comprises at least one device to regulate the temperature (20) of the water prior to the degassing system, to maintain the optimum temperature of the water in the fish treatment pond during the treatment. continuous treatment process.

Regarding the Advanced Oxidation Process (AOP) systems known and present in the invention, they are defined as water treatment processes carried out at temperatures and pressures similar to those of the environment that involve the generation of hydroxyl ions (OH—) in sufficient amounts to interact with the organic compounds present in the aqueous medium to be treated.

POAs include all catalytic and non-catalytic processes that take advantage of the high oxidizing capacity of the hydroxyl anion (OH—) and differ from each other in the way in which said ion is generated. These processes are mainly based on the "in situ" production of hydroxyl ions that react rapidly with most organic compounds.

Hydroxyl ions are optimal among strong oxidizers because they do not generate additional waste, they are not toxic and have a very short half-life, they are not corrosive to equipment, and they can generally be produced by equipment that is easy to handle. The hydroxyl ion reacts nonselectively on organic contaminants in aqueous media, ideally mineralizing them completely into $CO_2$, water and inorganic ions. The most important feature of advanced oxidation processes is that they are environmentally friendly.

Many AOPs are based on the combination of a strong oxidizing agent (eg ozone, hydrogen peroxide) with a catalyst (some metal ions or photocatalysts) and/or radiation (UV or ultrasound).

Thus, the AOP system (18) of the invention is connected to the second water accumulation tank (9), and where the AOP system inactivates, captures and/or eliminates the components, additives and any substance added to the flow of water at the treatment station, converting the treated water into purified, safe and residue-free fresh water.

In a variant of the present invention, the therapeutic treatment system additionally comprises a second ultraviolet light radiation device (21) integrated in the recirculation system of the treatment tank located between the filtration device and the treatment tank, for disinfection of the recirculation flow, as an additional element of active disinfection in the continuous in-situ therapeutic treatment system, where any of the ultraviolet light devices emit radiation in the wavelength range of 180 nm to 280 nm; where the emission of radiation close to 254 nm is effective against microorganisms, and where the emission of radiation close to 185 nm is effective in the degradation of organic compounds.

Finally, the system of the invention, where the flow of water (Q9) received by the retention and/or mixing pond (19), corresponds to the flow of fresh water treated in the AOP system (18) and coming from the treatment system continuous, free of residues and parasites; and that, in combination with the brine flow (Q3), allows mixing both components and recovering a reconstituted brackish water solution that is harmless to the environment, equivalent to seawater in its initial condition, to be returned to the source of origin.

In another variant of the invention, the system for moving the fish from one end to the other inside the treatment pond comprises at least one of the following: a propeller-pond system, a transfer screw system, a of pallets, a system of steps, a system of trays, and any system that allows the orderly and sequential flow of transport of fish inside a container, in which it is ensured that the first fish or group of fish that enters is the first fish or group of fish out.

In another embodiment of the invention, the treatment system can be implemented in the naval craft, in facilities for treating fish on land and in any facility that allows direct access to seawater.

In another variation of the invention, instead of the system for moving the fish from one end to the other within the pond, the treatment is carried out in blocks, with a determined amount of biomass and for a determined time.

In one embodiment of the present invention, the treatment system comprises a turbulence system to mix the flow of fresh water recovered from the treatment system and the brine product of reverse osmosis, which allows both components to be mixed homogeneously and continuously, to obtain a solution of innocuous brackish water product of the therapeutic treatment, to be returned to the sea.

Regarding the components to regulate the pH of the treatment water, since the fresh water obtained from the OR process does not have minerals that act as a buffer against the increase in dissolved $CO_2$ caused by the respiration of the fish, the pH drops rapidly at suboptimal levels for the fish, being necessary then to add a base such as $CaCO_3$ (calcium carbonate), $NaHCO_3$ (sodium bicarbonate), $Na_2CO_3$ (sodium carbonate), $Na_2SiO_3$ (sodium meta silicate) or another to maintain the pH of the water that will be in contact with the fish in a pH range between 6.0 and 7.5.

The present invention allows the maintenance of optimal water parameters throughout the continuous therapeutic treatment system, where, for example, oxygen can be controlled automatically by means of at least one oxygen sensor that records the oxygen concentration in the water. of the treatment tank and that is connected to a valve that allows the flow of oxygen from the oxygen production equipment (or oxygen storage tank), where if the level of O2 in the tank drops below a certain level and closes the valve if a certain O2 level is exceeded in the treatment pond water.

As part of the normal metabolism of fish, they excrete nitrogenous compounds that can become toxic to fish if they accumulate in the water. One way to avoid the above is to replace a percentage of the water with fresh water without nitrogenous compounds continuously (optimal) or in pulses (every time a threshold of nitrogenous compounds is exceeded). The water turnover rate will be determined by the number of fish in the pond, the water temperature, and other factors such as how long the fish have been fasting prior to treatment.

Regarding the transport of fish, the invention contemplates a system independent of the initial water pumping device, and that, in addition, only the fish are transported from one pond to another (practically without water), compared to other systems where the fish They are normally transported with a pump that moves water+fish. Thus, before entering the treatment pond, the fish are separated from the water. The fish, separated from the water, enter the pond and the separated water, before returning to the sea, passes through an integrated filter system to retain parasites that are released by the pumping effect, which even contemplates adding a second mechanical filter, connected to the separate waste tank.

The present invention further comprises an in-situ treatment method for fish comprising the following steps:

Extract water from the sea using the corresponding differentiated means, where the extracted sea water is sent to the reverse osmosis system;

Obtain fresh water from salt water, through the reverse osmosis system (1), obtaining as a result: a flow of fresh water (Q2) and a flow of brine (Q3) transported separately through the integrated treatment system;

Add additives to the flow of fresh water (Q2) obtained from reverse osmosis, to stabilize the physicochemical parameters of the water according to the requirements necessary for the operation of the integrated treatment system according to the flow of fresh water measured by a flow meter and produced by the reverse osmosis system;

Adding at least one therapeutic component necessary for the treatment of fish, according to the flow of fresh water required to carry out the continuous therapeutic treatment in fish, depending on the desired therapeutic objective, and where the flow of fresh water required is measured by a flowmeter;

Transport and direct the flow of fresh water with the corresponding components added in d) and e) (Q4'), to the treatment pond;

F. Maintain water quality parameters in an optimal range for the treatment of fish in the treatment pond, depending on the type of fish, biomass and temperature, including: oxygen level, water flow rate, concentration of additives and medicines, by controlling the filling of the treatment tank and continuous renewal of the water in the treatment tank with the flow water (Q4');

g. Extract fish from at least one culture unit to the integrated treatment system continuously, using the corresponding differentiated means, where the fish are transported in their aqueous medium from the culture unit to a fish and water separation system. sea;

h. Separate the fish from the seawater, in the separating device (2) and transport the fish sequentially, from the fish separating device (2) to the treatment pond (6), where the seawater is separated from the fish (Q1') is filtered by means of the first filter device, where any parasite eventually contained therein is also separated from said water prior to its return to the sea (Q1").

Once the fish are separated from their aqueous medium, they enter the treatment pond (6) continuously, where prior to entering the pond and also continuously they are subjected to a stage of counting and estimation of physical parameters, including weight and size, which allows estimating the necessary parameters for carrying out the treatment;

Once the fish are in the treatment pond (6), carry out the in-situ treatment of the fish, including: maintaining a dose of medicine necessary for the in-situ treatment of sick fish, activating the filtering system for the flow of treatment water (Q5) to extract parasites and/or inactivate toxic substances that are affecting the fish being treated, degas the treatment water flow to remove CO2 and return the recirculating treatment water flow (Q6) to the treatment pond, and where the in-situ treatment system comprises a period necessary to carry out the treatment, which further comprises a certain exposure and permanence time for the fish in the treatment pond, regulated by the user;

Transporting the treated fish continuously to a container unit for treated fish, where the conveyor system comprises a separator device (17) that allows the treated fish to be separated from the water in the treatment pond, where the treated fish are transported to the treated fish unit and the recovered water (Q4') in this way is returned to the treatment pond;

Continuously extract a portion of the treatment water flow (Q6), towards the second fresh water accumulation pond (9) from which the water flow (Q8) is pumped directly to the AOP system (18), for inactivation of chemical substances, additives, mineralization of medicines and elimination of CO2, obtaining a flow of fresh water purified and free of residues equivalent to the flow of purified water initially obtained as a result of reverse osmosis (Q9), Mix the brine (Q3) and the fresh water from the treatment purified and free of residues (Q9), collecting both components in the retention pond (19), throughout the period of treatment of the fish to ensure a homogeneous mixture, Release the homogeneous mixture of reconstituted brackish water (Q10), back into the sea.

The method of the proposed invention is a continuous process, where the fish make their way through the treatment pond during a journey that ensures a certain time through the treatment pond, allowing the action of the treatment, ensuring its effectiveness. The flow of fish is controlled by a fish counter, which is after the drainage and before they enter the pond, continuously.

The method of the invention includes the addition of stabilizing additives to the fresh water resulting from reverse osmosis, including: mineral salts, artificial additives, natural additives, buffer solutions or pH stabilizers, and any other suitable additive to achieve the necessary parameters to carry out the treatment, where the mineral salts can be chosen from the list that includes: CaCO3, NaHCO3, Na2CO3, Na2SiO3, and any other salt that allows maintaining the pH of the treatment water between pH 6.0 and 7.5.

Regarding the medicines or therapeutic components indicated in the method of the invention, and added to the treatment tank, they include: medicines for external infections, medicines for internal infections, antiparasitics, anesthetics and any other medicine necessary for the treatment of a specific disease existing in the fish under treatment.

In one embodiment of the method of the invention, the therapeutic component to be considered can be chosen from the list that includes: a) Antiparasitics, such as pyrethroids (eg cypermethrin, deltamethrin), organophosphates (eg azamethiphos, trichlorfon), benzoylureas (eg: lufenuron, hexaflumuron, diflubenzuron, triflumuron), neonicotinoids, (eg imidacloprid), amidines (eg cymiazole), phenols (eg bithionol), imidazoles (eg levamisole), formalin, hydrogen peroxide, peracetic acid, chloramine-T, methylene blue, and any other antiparasitic; b) Antimicrobials, such as beta-lactams (eg, amoxicillin), aminoglycosides (eg, neomycin), tetracyclines (eg, oxytetracycline), macrolides (erythromycin), chloramphenicol, sulfonamides (eg, sulfamerazine), potentiated sulfonamides (eg, trimeptropin+sulfadiazine), nitrofurans (eg, furazolidone), quinolones (eg, oxolinic acid), fluoroquinolones (eg, flumequine), and any other antibiotics; c) Anesthetics, such as benzocaine, tricaine, iso-eugenol, metomidate and any other anesthetics; as well as a mixture of any of said types of therapeutic components.

In another embodiment of the method of the invention, where the container unit for treated fish corresponds to the farming unit for diseased fish. In another embodiment of the method of the invention, it can be applied directly to existing fish farming systems without the need for require additional isolation by removing diseased fish from the culture area and returning subsequently treated fish back to the same culture area.

In another embodiment of the method of the invention, the effective mixture of recovered fresh water and brine in the treatment pond is carried out by means of the turbulence system, where the turbulence system ensures that the mixture of the components is homogeneous and practically uniform. continuous flow.

A variant of the method of the present invention comprises the following steps: a) the treatment pond is loaded with fresh water alone or with some therapeutic agent; b) the water in the treatment pond begins to recirculate; (c) the fish are introduced until reaching the biomass that the system can support; (d) together with the entry of the fish or once they have entered, water is renewed at a rate that allows maintaining optimal water quality parameters in the treatment pond; (e) the same proportion of water that is renewed is derived from the recirculation circuit to the AOP treatment system; (f) once the exposure time of the fish to the treatment is completed, they are transferred to the culture unit; (g) The process is repeated with a new group of fish.

In another embodiment of the method of the invention, an initial calibration is considered, where the initial calibration in turn comprises the definition of specific parameters, including: the dosage of the therapeutic agent depending on the type of fish and its biomass, type of pathogen to be treated, temperature of the treatment water, rate of recirculation or renewal of water in the treatment pond, the level of oxygen in the treatment pond.

EXAMPLES OF THE INVENTION

Below are some examples that allow a better understanding of the proposed invention, as well as its application:

Example 1: Treatment of 70,000 salmon (*Salmo salar*) of 1.0 kg average weight affected by the external parasite *Caligus rogercresseyi* in a farm composed of floating cages in the sea (salinity 3.2%, temperature 12° C.) through the application from a fresh water bath containing azamethiphos at a concentration of 0.1 mg/l for one hour.

The integrated treatment system installed on board a boat that travels by its own means to the farm with fish affected by the parasitic copepod *C. rogercresseyi*. The treatment pond with a capacity of 300 m3 of water for fish bathing. The boat sits on the edge of the culture cage containing the affected fish, fasted for at least 48 hours before deworming treatment.

Before transferring the fish to the treatment pond, fresh water production begins by pumping a seawater flow of 350 m3/h from a seawater intake installed at the bottom of the ship to the reverse osmosis device, which generates a flow of 125 m3/h of fresh water (conductivity less than 75 mS/m) and a flow of 225 m3/h of brine (approximate salt concentration 4.8%).

A concentrated solution of sodium silicate is automatically added to the fresh water by means of a dispenser at a rate of 25 ml per m3 of fresh water produced, in order to stabilize the pH between 6.5 and 7.5. The pH stabilized water enters an accumulation pond and from there is pumped to the treatment pond.

Before entering the treatment pond, a concentrated solution of azamethiphos is automatically injected into the flow of fresh water stabilized in pH, in order to reach a therapeutic concentration of azamethiphos of 0.1 mg/l in the treatment pond. Once the treatment pond is filled with fresh water stabilized in pH and containing 0.1 ppm of azamethiphos, the recirculation of the treatment pond water begins and the oxygen generation equipment, the control and recording device are started up. of environmental parameters of the water and the stabilizer device of dissolved gases.

The device for the movement of fish into the treatment pond is also started, which is regulated to ensure a retention time of one hour for the fish in the treatment pond. The fish to be treated are transferred from the culture cage by means of a transfer pump that sucks the fish together with the surrounding water in which they are found at a ratio of 15% fish and 85% water. The mixture of water and live fish is separated in a dewatering device, with the live fish entering the treatment pond at a rate of 30,000 sick fish per hour, in order to maintain a maximum density of close to 100 kg of fish per m3 of water in the treatment pond. The amount of fish entering the treatment pond is recorded continuously by means of the biomass counter and estimator device.

Mediante un dosificador se agrega en forma automática al agua dulce una solución concentrada de silicato de sodio a una tasa de 25 ml por m3 de agua dulce producida, con el objetivo de estabilizar el pH entre 6.5 y 7.5. El agua estabilizada en pH ingresa a un estanque de acumulación y desde allí se bombea al estanque de tratamiento.

The seawater separated from the fish is filtered prior to its return to the sea, in order to retain the parasites detached from the fish by the effect of pumping and the retained parasites accumulate in a thousand-liter mobile tank for subsequent destruction and Disposal on land according to applicable regulations. Once the first fish enter the treatment pond, the oxygen generating device is regulated in such a way that it automatically injects a sufficient amount of oxygen into the pond to maintain at all times an oxygen saturation in the treatment water greater than 70% and less than 120%.

The entry of fresh water stabilized in pH and containing a concentration of 0.1 mg/l of azamethiphos into the treatment pond at a rate of 125 m3/h is maintained throughout the process. Simultaneously, the same amount of water (125 m3/h) is extracted from the recirculation circuit, thus allowing an adequate renewal of treatment water to maintain a level of ammonia (NH3) in the treatment pond water always less than 0.03 mg/l, a concentration of dissolved carbon dioxide (CO2) always less than 20 mg/l and a pH between 6.0 and 7.0.

Throughout the duration of the treatment, the water recirculation circuit is kept in operation at a rate of 2,000 m3/h, allowing permanent filtering of the parasites released from the fish by the effect of the treatment water (fresh water+ azamethiphos). The parasites, together with the organic matter released into the water by the fish, are retained by the 50-micron filtration device and transferred to a parasite accumulation pond for later disposal on land, in an authorized landfill for hazardous waste due to the eventual presence of azamethiphos.

One hour after the start of the process, the first fish that entered the treatment pond arrive at the discharge point and are returned without the presence of parasites to the culture center by gravity through a hose into which pumped seawater is simultaneously injected. from a water intake on the boat, allowing safe movement to its destination culture cage.

Fish continue to be transferred to the treatment pond continuously until the last sick fish enters the treatment pond and the device for continuous movement of fish from one end of the pond to the other is kept in operation until the last fish has completed his treatment of an hour of exposure to the bathroom. In this example, the total of sick fish (70,000 salmon of 1.0 kg) can be treated with fresh water and azamethiphos in a period of 3.3 hours. The water that is continuously extracted from the recirculation circuit, free of parasites, but with the presence of azamethiphos, is pumped to the advanced oxidation system in order to mineralize the azamethiphos through the action of hydroxyl ions (degradation into CO2, water and minerals).

Finally, the flow of water already free of azamethiphos is guided by gravity to a mixing tank where it is homogenized with the flow of brine generated by the reverse osmosis system (225 m3/h) and a flow of 350 m3/h is discharged into the sea. m3/h of reconstituted seawater at 3.2% salinity and without the presence of parasites or azamethiphos.

Example 2: Treatment of 70,000 salmon (*Salmo salar*) of 1.0 kg average weight affected by the gill parasite *Neoparamoeba* sp. in a culture center composed of floating cages in the sea (salinity 3.2%, temperature 12° C.) by applying a fresh water bath for 30 minutes and destroying parasites using UV light.

The same procedure as above, but in this case no type of therapeutic agent is added and the forward speed of the fish displacement device inside the treatment pond is increased so that the exposure time of the fish to fresh water is only 30 min, enough to detach the amoebas from the gills of the affected fish.

The transfer speed of the fish from the affected culture cage to the treatment pond is therefore increased at a rate of 60 tons per hour, always maintaining a maximum density of 100 kg of live fish per m3 of treatment water. The total duration of the treatment process in this example is 1.46 hours.

In this example, the UV light water disinfection device installed in the recirculation circuit is turned on throughout the process and is regulated to deliver a dose of at least 50 mJ/cm2 of UV irradiation close to 254 nm to the water flow.

of recirculation (2,000 m3/h), which ensures that the cells of the amoebas detached from the fish will be completely destroyed and will not be able to re-infest the fish.

Since in this example there is no use of a therapeutic agent that could affect the environment, the operation of the advanced oxidation system is not necessary. In any case, the fresh discharge water, filtered and freed from live amoebas, is mixed with the brine from the reverse osmosis system prior to its discharge into the sea.

The invention claimed is:

1. An integrated system of continuous in-situ treatment for fish in fresh water obtained from salt water or sea water, to eliminate parasites from treated fish and thus avoid reinfection in fish, reducing the risk of the appearance of resistant parasites, and avoid contamination of the marine environment with organic compounds used in the treatment of fish, which incorporates a pond with continuous recording of physicochemical parameters of the water and treatment for fish, a fish transport mechanism, first separator device and a second separator device for water and fish, an oxygen generating device, at least one level sensor, at least one pump, at least one flow meter, comprising:
   a) a system for moving the fish from one end to the opposite end of the fish treatment pond;
   b) means of entry to the treatment system, for the entry of fish and sea water, respectively, where the sea water is separated into fresh water and a brine mixture, wherein the fresh water is used as a means for the therapeutic treatment of the fish;
   c) a fish transport mechanism, for the transport of fish from the differentiated entrance for fish towards the treatment pond and through the different sections and stations present in the integrated treatment system;
   d) a first separator device to separate and conduct the fish from the water from an input means to the treatment pond;
   e) a first filter device for retaining parasites arranged between the fish separator device and a point of direct evacuation of the water to the sea, separated from the fish;
   f) a first receiving pond for the parasites that have been retained by the first filter device (3);
   g) a counter and weight estimator for the fish transported between the fish inlet means and the treatment pond;
   h) a first monitoring system to register and regulate the speed of operation of the device and movement of the fish within the treatment pond;
   i) a water recirculation circuit of the treatment tank consisting of (i) at least one second filter device, (ii) a receiving tank for water filtered from the second filter device, (iii) at least one pump to drive the filtered water from the receiving tank, (iv) a gas removal system connected to the treatment tank and at least one pump to drive the flow of filtered water from the reception tank to an advanced oxidation system (AOP), for final treatment prior to return to the sea and (v) a second tank accumulation of organic matter and parasites which are separated by the second filter device from the recirculated treatment water;
   j) a system for production and controlled injection of oxygen into the treatment tank, which comprises at least one sensor for measuring the concentration of oxygen in the water in the treatment tank and which also allows, injecting in at least one point of said pond the amount of oxygen necessary to the treatment water to support the oxygen demand of the fish being treated and maintain the oxygen level within an optimal range for the fish, throughout the recirculation circuit;

k) a second monitoring system and continuous recording of physical-chemical parameters of the water in the treatment pond comprising at least: a sensor for measuring dissolved oxygen in fresh water, at least a sensor for measuring $CO_2$ dissolved in fresh water, at least a sensor for temperature measurement, at least a sensor for salinity measurement, at least a sensor for oxidation reduction potential (ORP) measurement and at least a sensor for pH measurement, l) a reverse osmosis system to separate the water from the seawater, from its soluble components and other particles present, to obtain a flow of purified water (fresh water) and a flow of brine;

m) a seawater flow input device, which feeds the reverse osmosis system;

n) a first dosing device to automatically and controlled add the necessary components to the flow of fresh water comprising minerals and stabilizer compounds and/or pH regulators;

o) at least one flow meter to continuously measure the flow of fresh water produced, delivering the information to the dosing device;

p) a first accumulator tank of fresh water;

q) at least one variable flow pump or impeller pump to pump water from the freshwater accumulator tank to mix it with the water from the recirculation circuit passing through a degasser and entering with a stabilized water flow;

r) at least one level sensor located in the treatment tank connected to the freshwater booster pump to adjust the flow of replacement water to be added to the treatment tank, during the continuous therapeutic treatment;

s) a second flow meter, connected to a second metering device;

t) a second dosing device to automatically and controlled add at least one therapeutic and/or biologically active compound to the flow of fresh water entering the treatment tank;

u) a second fish separator device, to extract and separate the fish from the water of the treatment pond to a storage area for treated fish, separating them from the treatment water and returning the separated water from the fish to return to treatment pond;

v) an advanced oxidation system (AOP) of organic compounds present in the discharge water of the treatment pond, which includes at least one oxidation device for the generation of hydroxyl ions (OH—), which can be chosen from the list comprising: a UV ultraviolet light device, an electrochemical device, a photochemical device, an oxidizing chemical component and any combination of these, in order to mineralize organic contaminants into components harmless to the environment, such as $CO_2$, water and inorganic ions;

w) a second tank for storing fresh water containing therapeutic agents and connecting the outgoing freshwater flow from the water recirculation circuit of the treatment tank, with the advanced oxidation system (PSA);

x) a retention and/or mixing tank, configured to accumulate and mix the fresh water coming out of the advanced oxidation device (AOP), recovered from the treatment circuit, with the brine obtained from the process reverse osmosis from seawater, y) a restituted salty water flow outlet device, which returns the neutralized and innocuous reconstituted salty water mixture back to the sea.

2. The system of claim 1, wherein it is configured to be mounted on a naval craft, such as a ship, boat, raft, pontoon.

3. The system of claim 2, wherein the fish entry means is configured for the entry of fish from a fish container unit, where sick fish or healthy fish that require prophylactic treatment are found.

4. The system of claim 3, wherein the sick fish container unit can be chosen from the list comprising: an additional container unit of the naval artifact in which the treatment system is located, a fish container in a floating farm in the sea, a fishpond in a land-based farm that pumps seawater, and a fish holding unit in a second naval craft.

5. The system of claim 1, wherein the reverse osmosis system comprises a pre-filtering system for compounds from seawater, wherein said system comprises the removal of components from seawater in a range of size between 75 and 1 microns, where said removal of the components can be carried out in a single stage, and/or in multiple sequential stages.

6. The system of claim 1, wherein it further comprises a differentiated transport subsystem for the reverse osmosis products independently, including the transport of purified water from seawater, separated from the transport of brine and other components extracted from seawater.

7. The system of claim 1, wherein the fish water separation system is configured to separate the fish by certain classification parameters, including size, in order to ensure that only fish of a certain size enter to the treatment pond.

8. The system of claim 1, wherein at least the first and second filters correspond to mechanical filters, and where in addition at least the second mechanical filter device is fed by gravity from the treatment tank for fish.

9. The system of claim 1, wherein it further comprises a freshwater flow temperature control system connected to the recirculation circuit, configured to regulate the temperature of the therapeutic treatment system according to the specific parameters required.

10. The system of claim 1, wherein the gas removal system comprises a degassing device that allows air to circulate to the treatment system to remove gases, including carbon dioxide accumulated in the recirculation flow by effect of fish respiration in the treatment pond and return the filtered, disinfected and degassed water by gravity to the fish treatment pond.

11. The system of claim 10, wherein the temperature control system comprises at least one device to regulate the temperature of the water prior to the degassing system, configured to maintain the optimum temperature of the water in the fish treatment tank during the continuous treatment process.

12. The system of claim 1, wherein the AOP system is connected to the second water accumulation tank.

13. The system of claim 12, wherein it comprises a second ultraviolet light radiation device integrated in the recirculation system of the treatment tank located between the second filtration device and the storage tank, treatment, for the disinfection of the recirculation flow, as an additional element of active disinfection in the continuous in-situ therapeutic treatment system.

14. The system of claim 1, wherein it comprises a UV light system that emits radiation in the wavelength range of 180 nm to 280 nm.

15. The system of claim 1, wherein the flow of water received by the retention and/or mixing tank, corresponds to the flow of fresh water treated in the AOP system and coming from the system of continuous treatment, free of residues and parasites; and that, in combination with the brine flow, allows mixing both components and recovering a reconstituted salty water solution that is harmless to the environment, equivalent to seawater in its initial condition, to be returned to the source of origin.

16. The system of claim 1 wherein the system for moving the fish from one end to the other inside the treatment pond, comprises at least one of the following: a propeller-pond system, a system of transfer screw, a system of screens or bulkheads, a system of steps, a system of trays, and any system that allows the orderly and sequential flow of fish transport inside a container, in which it is ensured that the first fish or group of fish that enters is the first fish or group of fish that leaves.

17. The system of claim 16, wherein it comprises a turbulence system to mix the flow of fresh water recovered from the treatment system and the brine produced by reverse osmosis.

\* \* \* \* \*